(12) United States Patent
Premoli et al.

(10) Patent No.: US 12,463,508 B2
(45) Date of Patent: Nov. 4, 2025

(54) PLANT AND METHOD FOR MANUFACTURING FERROMAGNETIC CORES OF ELECTRIC MACHINES

(71) Applicant: ERNESTO MALVESTITI S.P.A., Cinisello Balsamo (IT)

(72) Inventors: Marco Premoli, Cinisello Balsamo (IT); Plinio Mussi, Cinisello Balsamo (IT); Lino Verdino, Cinisello Balsamo (IT)

(73) Assignee: ERNESTO MALVESTITI S.P.A., Cinisello Balsamo (IT)

( * ) Notice: Subject to any disclaimer, the term of this patent is extended or adjusted under 35 U.S.C. 154(b) by 224 days.

(21) Appl. No.: 18/246,336

(22) PCT Filed: Sep. 23, 2021

(86) PCT No.: PCT/IB2021/058674
§ 371 (c)(1),
(2) Date: Mar. 23, 2023

(87) PCT Pub. No.: WO2022/064408
PCT Pub. Date: Mar. 31, 2022

(65) Prior Publication Data
US 2023/0396136 A1 Dec. 7, 2023

(30) Foreign Application Priority Data
Sep. 24, 2020 (IT) .................. 102020000022621

(51) Int. Cl.
*H02K 15/02* (2025.01)
*B32B 7/14* (2006.01)
(Continued)

(52) U.S. Cl.
CPC .............. *H02K 15/02* (2013.01); *B32B 7/14* (2013.01); *B32B 15/043* (2013.01);
(Continued)

(58) Field of Classification Search
CPC ........ H05K 15/02; B32B 7/14; B32B 15/043; B32B 37/1292; B32B 38/004;
(Continued)

(56) References Cited

U.S. PATENT DOCUMENTS 5,965,220 A * 10/1999 Schopping ................ B05C 1/10
118/406
2013/0078013 A1 * 3/2013 Chillscyzn ............ B29C 64/147
399/307
(Continued)

FOREIGN PATENT DOCUMENTS

DE 102018110951 A1 5/2019
FR 3058284 A1 5/2018
(Continued)

OTHER PUBLICATIONS

International search report and written opinion issued by the EPO on Apr. 2, 2022 for PCT/IB2021/058674.

*Primary Examiner* — George R Koch

(57) ABSTRACT

A plant (10) and a method are described for manufacturing ferromagnetic cores of electric machines formed by a plurality of laminations which are packed and joined together by gluing in a blanking/punching tool (15) to which a continuous metal laminate (11) of ferromagnetic material is fed. In addition to the blanking/punching tool, the plant comprises at least one unit (21) for applying an adhesive material to a surface of the continuous metal laminate, at least one unit (25) for applying an activating compound to the opposite surface of the continuous metal laminate and at least one control unit (22) for controlling the application of the adhesive material and the activating compound into the respective application units. The unit for applying an adhesive material to a surface of the continuous metal laminate comprises a printing device (23, 60) and at least one transfer element (28, 51) on which the printing device deposits the
(Continued)

adhesive material according to one or more impressions of a shape corresponding to the outline of each of the laminations. The adhesive material is then applied by the at least one transfer element to a surface of the continuous metal laminate according to the outline of each lamination, which is defined by the impressions.

20 Claims, 13 Drawing Sheets

(51) Int. Cl.
    *B32B 15/04*     (2006.01)
    *B32B 37/12*     (2006.01)
    *B32B 38/00*     (2006.01)
    *B32B 38/04*     (2006.01)

(52) U.S. Cl.
    CPC ...... *B32B 37/1292* (2013.01); *B32B 38/0004* (2013.01); *B32B 2038/042* (2013.01); *B32B 38/145* (2013.01); *B32B 2255/06* (2013.01)

(58) Field of Classification Search
    CPC ............ B32B 38/145; B32B 2038/042; B32B 2255/06; B29C 65/787; B05C 9/025; B05C 1/10; B05C 11/04
    See application file for complete search history.

(56) References Cited

U.S. PATENT DOCUMENTS

| | | | | |
|---|---|---|---|---|
| 2013/0087281 A1* | 4/2013 | Krum | ..................... | B41F 19/004 |
| | | | | 156/324 |
| 2015/0048713 A1* | 2/2015 | Caamano | ............... | H02K 1/148 |
| | | | | 310/216.106 |
| 2015/0097463 A1* | 4/2015 | Blocher | ................... | H02K 1/28 |
| | | | | 310/216.065 |
| 2021/0057969 A1* | 2/2021 | Okudaira | ............... | B21D 43/22 |
| 2022/0051838 A1* | 2/2022 | Bursy | ........................ | H01F 3/02 |
| 2023/0253140 A1* | 8/2023 | Takeda | ..................... | B05D 5/10 |
| | | | | 29/607 |

FOREIGN PATENT DOCUMENTS

| | | | | | |
|---|---|---|---|---|---|
| WO | WO-2019180856 A1 | * | 9/2019 | ............... | B21D 8/02 |
| WO | WO-2020053230 A1 | * | 3/2020 | ........... | B32B 15/011 |
| WO | WO-2022009878 A1 | * | 1/2022 | ............... | B05C 5/02 |
| WO | 2022064408 A1 | | 3/2022 | | |

* cited by examiner

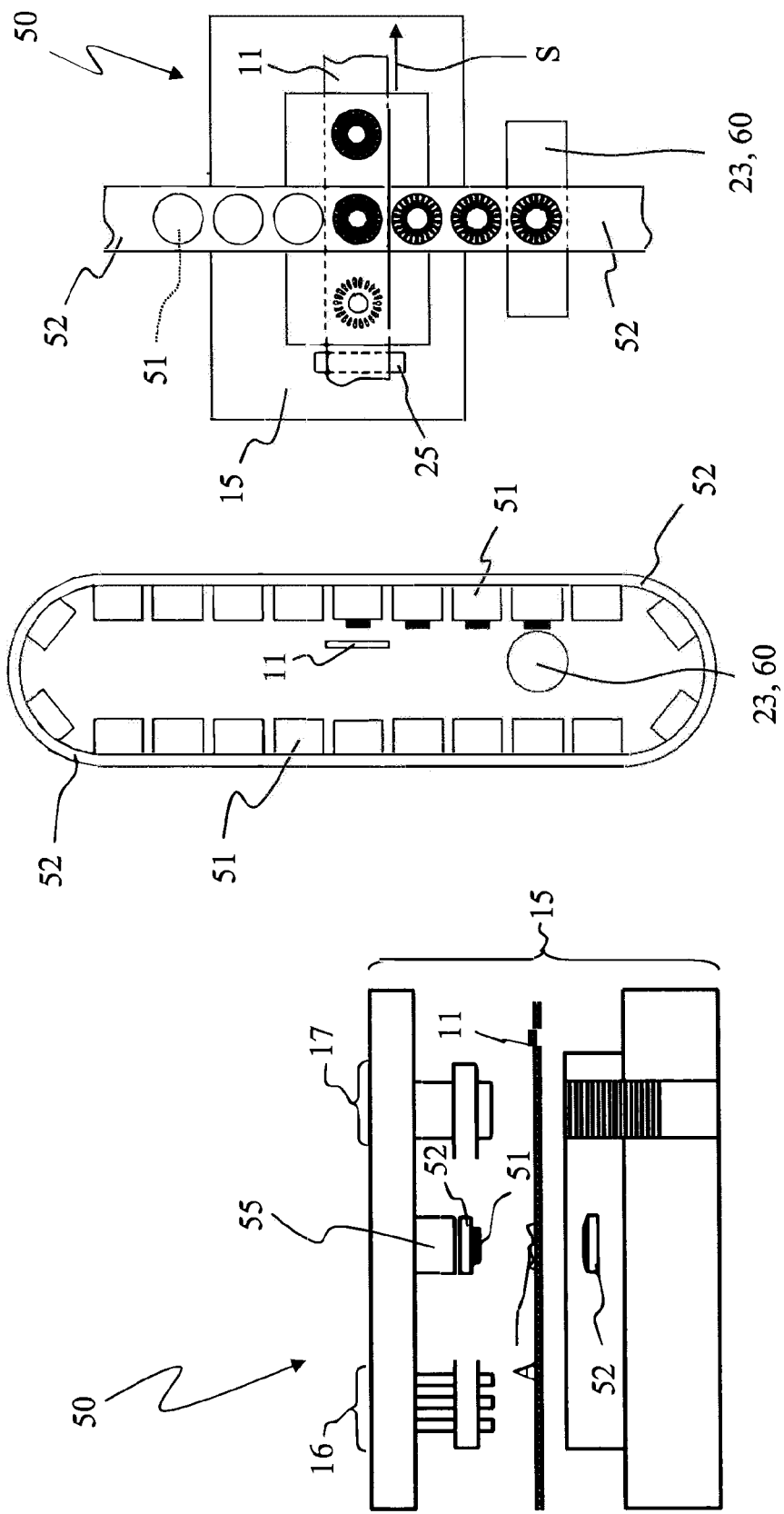

PLANT AND METHOD FOR MANUFACTURING FERROMAGNETIC CORES OF ELECTRIC MACHINES

This application is a U.S. national stage of PCT/IB2021/058674 filed on 23 Sep. 2021, which claims priority to and the benefit of Italian Application No. 102020000022621 filed on 24 Sep. 2020 the contents of which are incorporated herein by reference in their entireties.

FIELD OF THE INVENTION

The present invention relates to a plant and a method for manufacturing ferromagnetic cores of electric machines, consisting of packs of laminations and, in particular, of ferromagnetic cores composed of a plurality of laminations which are packed and joined together by gluing.

PRIOR ART

It is known in the art to make ferromagnetic cores of electric machines, e.g. electric motors, by stacking a plurality of metal laminations which are packed and fastened together mechanically, e.g. by crimping s formed during the blanking/punching working.

Techniques for mutual fastening of the laminations by gluing are also known. Patent application no. US2015097463A1 describes, as an example, various methods for making packs of metal laminations joined together by gluing, wherein the adhesive material is deposited through spraying techniques by nozzles on a surface of a continuous metal laminate fed to the blanking/punching tool, while an activating agent is deposited on the opposite surface of the metal laminate.

Basically, as shown e.g. in FIGS. 23-27 which depict the prior art, the application by means of spraying of the adhesive material A by nozzles U does not allow to reach certain areas denoted e.g. by N in FIGS. 23-25, which can result in superimpositions of the adhesive material (FIG. 26) or it can affect areas outside the contour of the lamination (FIG. 27).

In addition to the embodiments in which spraying techniques are used for applying the adhesive material, this document also suggests an application technique using a rubber-coated roller capable of applying the adhesive material to the lower surface of the continuous metal laminate. An auxiliary roller is placed at a minimum distance from the rubber-coated roller to regulate/dose the amount of adhesive material that is transferred to the rubber-coated roller and, consequently, the thickness of the adhesive material applied to the continuous metal laminate.

In any case, the embodiments described in US2015097463A1 do not suggest using well-defined impressions to apply the adhesive material to the metal laminate. In case of using spraying techniques, it is not possible to delimit any impression of the adhesive material applicable to the continuous metal laminate, while in case of application through a rubber-coated roller only some areas are delimited in which the adhesive material does not need to be applied to the continuous laminate; these areas are delimited by recesses formed on the rubber-coated roller and can accumulate adhesive material which can overflow from the recesses and compromise the uniform distribution of the adhesive material on the continuous laminate, thus compromising the correct regulation of the adhesive material thickness on the continuous laminate. When each lamination is blanked and then packed to an underlying lamination, the adhesive material can overflow from the ferromagnetic core being formed. The spillage of adhesive material can lead to functionality problems in the tool (e.g. seizures), quality problems in the pack of laminations forming a ferromagnetic core, e.g. shape tolerances not respected, and cleaning problems in the blanking/punching tool.

DE102018110951A1 describes a method and a plant for making ferromagnetic cores composed of laminations glued to each other. In this document, it is specified that the adhesive can be applied by means of spraying techniques, by interposing in any way masks, or by printing processes, such as e.g. silk-screen printing and flexography. However, the printing techniques described in this document do not take into account the fact that the adhesive must be applied to a metal laminate which, by its nature, can have any variations in thickness, any burrs generated during the previous blanking or rolling steps, any impurities or foreign bodies. All these drawbacks can affect the correct distribution of the adhesive on the moving metal laminate or even cause damages to the adhesive application units by means of the mentioned printing processes.

Moreover, none of these prior documents takes into account the fact that the adhesive materials used and any activating compounds can be harmful to the health of the operators working in the environments in which the plants for manufacturing ferromagnetic cores by gluing are installed.

SUMMARY OF THE INVENTION

This being stated, it is a task of the present invention to provide an improved plant and method for manufacturing ferromagnetic cores formed by a plurality of packed laminations and joined together by gluing for applications in electric machines.

Within this task, an object of the present invention is to provide a plant and a method of the type identified above which allow to manufacture ferromagnetic cores formed by packs of laminations joined together by gluing in which precision and repeatability are ensured in the application of adhesive material to the laminations also at very high cycling speeds.

Another object of the present invention is to provide a plant of the type identified above, which is versatile and can be easily adapted to the different requirements for manufacturing ferromagnetic cores, both by applying the adhesive material to the outside of a blanking/punching tool and inside the same blanking/punching tool.

A further object of the present invention is to provide a plant and a method of the type identified above, which are capable of ensuring a high precision of positioning of the adhesive material on the continuous laminate, in particular, by avoiding spillages of adhesive material outside the pack of laminations which form each ferromagnetic core.

Yet another object of the present invention is to provide a plant and a method of the type identified above, which allow to maximize the area of application of the adhesive material to the continuous metal laminate according to the outline of each lamination.

Yet another object of the present invention is to provide a plant and a method of the type identified above, which allow to ensure the uniformity of thickness of the adhesive material applied to the continuous metal laminate according to the outline of each lamination.

Yet another object of the present invention is to provide a plant and a method of the type identified above, which allow to compensate any irregularities and/or malformations of the metal laminate on which the adhesive material needs to be applied.

These and other objects are achieved by the present invention which concerns a plant according to claim 1 for manufacturing ferromagnetic cores of electric machines, wherein each of the ferromagnetic cores is formed by a plurality of laminations which are packed and joined together by gluing in a blanking/punching tool. Further peculiar characteristics of the present invention are set forth in the respective dependent claims.

A plant object of the present invention is used for manufacturing ferromagnetic cores of electric machines. Each of the ferromagnetic cores is formed by a plurality of laminations which are packed in a blanking/punching tool to which a continuous metal laminate of ferromagnetic material is fed. The laminations are joined together by gluing. The blanking/punching tool comprises at least one blanking/punching station and at least one station for cutting and packing the laminations blanked from the continuous metal laminate. The plant further comprises at least one unit for applying an adhesive material to a surface of the continuous metal laminate, at least one unit for applying an activating compound to the opposite surface of the continuous metal laminate and at least one control unit for controlling the application of the adhesive material and the activating compound into the respective application units.

In an embodiment of the present invention, the unit for applying an adhesive material to a surface of the continuous metal laminate comprises a printing device and at least one transfer element on which the printing device deposits the adhesive material according to one or more impressions of a shape corresponding to the outline of each of the laminations. The adhesive material is then applied by the at least one transfer element to a surface of the continuous metal laminate according to the outline of each lamination, which is defined by the impressions.

The transfer element, which is put into direct contact with the continuous metal laminate to apply the adhesive material thereto, allows to absorb any irregularities of the continuous metal laminate, such as e.g. variations in the thickness of the continuous metal laminate which can compromise the correct application of the adhesive material on the continuous metal laminate.

Moreover, the presence of the transfer element allows to avoid damages to the unit for applying the adhesive material and, in particular, to the printing device, in case the continuous metal laminate has burrs, damages or any foreign bodies.

A distribution of the adhesive material with uniform and repeatable thickness is thus achieved on each of the laminations, which will then be blanked from the continuous metal laminate and packed on the underlying laminations in the station for cutting and packing of the laminations.

In an embodiment, the at least one element for transferring the adhesive material to a surface of the continuous metal laminate comprises one or more pads each receiving at least one impression of the adhesive material from a silk-screen printing device or flexo-printing device.

In an embodiment, the pads are constrained to a cylindrical roller interposed between the printing device and the continuous metal laminate.

In another embodiment, the pads are constrained to a closed belt which moves in a direction transverse with respect to the direction of travel of the continuous metal laminate. The printing device, which deposits the adhesive material on the pads, is arranged along the path defined by the closed belt.

This solution allows to decouple the advancement of the continuous metal laminate with respect to the steps of depositing the adhesive material on the various pads.

According to a possible embodiment, the printing device is a printing device which adopts a circular or rotary silk-screen printing technique.

In other embodiments, the printing device can be a printing device which adopts a flat silk-screen printing technique or a flexography technique.

In an embodiment, the at least one unit for applying an activating compound to the opposite surface of the continuous metal laminate is combined with at least one chamber in which a depressurized condition is applied.

The invention further relates to a method for manufacturing ferromagnetic cores of electric machines, wherein each of the ferromagnetic cores is formed by a plurality of laminations which are packed in a blanking/punching tool to which a continuous metal laminate of ferromagnetic material is fed. The laminations are joined together by gluing. The blanking/punching tool comprises at least one blanking/punching station and at least one station for cutting and packing the laminations blanked from the continuous metal laminate. According to a possible embodiment, the method comprises the steps of:

a) advancing a continuous metal laminate of ferromagnetic material through a plant for manufacturing ferromagnetic cores of electric machines, which is fed with the continuous metal laminate;

b) applying an adhesive material to a surface of the continuous metal laminate through at least one unit for applying the adhesive material controlled by at least one control unit of the plant for manufacturing ferromagnetic cores of electric machines;

c) applying an activating compound to the opposite surface of the continuous metal laminate through at least one unit for applying the activating compound controlled by the at least one control unit of the plant for manufacturing ferromagnetic cores of electric machines.

According to a possible embodiment of the present invention, in step b) the adhesive material is deposited by a printing device on at least one transfer element according to one or more impressions of a shape corresponding to the outline of each of the laminations. The adhesive material is then applied by the at least one transfer element to a surface of the continuous metal laminate according to the outline of each lamination, which is defined by the impressions.

In an embodiment of the method, the adhesive material is applied to the continuous metal laminate before the continuous metal laminate reaches the station for cutting and packing the blanked laminations from the continuous metal laminate.

According to an embodiment of the method, the impressions of adhesive material, which are deposited on the at least one transfer element to be then applied to a surface of the continuous metal laminate, have the same outline as each of the laminations and reduced dimensions in the proximity of the edges that follow the geometry of each of the laminations, in such a way as to leave an area free of adhesive material in the proximity of the edges. This allows to apply the adhesive material in such a way as to prevent the adhesive material from overflowing from the pack of laminations in the ferromagnetic core achieved as a finished product. The impressions can however be adapted with particular shapes depending on the various manufacturing requirements, such as e.g. to create areas without deposit of adhesive material, which act as containment tanks for the excess adhesive material.

In an embodiment of the method, the at least one element for transferring the adhesive material to a surface of the continuous metal laminate comprises one or more pads each receiving one or more impressions of the adhesive material from a silk-screen printing device or flexo-printing device.

In particular, the adhesive material is deposited by a circular or rotary silk-screen printing technique on one or more pads and then applied to a surface of the continuous metal laminate.

In other embodiments, the adhesive material can be deposited by a flat silk-screen printing technique or a flexography technique on one or more pads and then applied to a surface of the continuous metal laminate.

According to an embodiment of the method of the present invention, the activating compound is applied to the opposite surface of the continuous metal laminate by providing a depressurized condition in the proximity of the application area. This allows to prevent, or in any case limit, the dispersion into the environment of any harmful vapours which can be harmful to the operators and which can also pollute the adhesive material applied to the continuous metal laminate.

It has been found that a transfer element interposed between a printing device, which deposits the adhesive material, and the continuous metal laminate allows the absorption of any variations in the thickness of the metal laminate which can have influence on the distribution of the same adhesive. Moreover, by interposing a transfer element between the printing device and the metal laminate, the printing device is protected from the presence of possible impurities on the laminate, burrs due to the process of blanking or rolling and cutting of the continuous metal laminate (coil), and the presence of any foreign bodies.

A further advantage given by the interposition of a transfer element is represented by the possibility of being able to regulate the application pressure of the adhesive material with greater precision, thus allowing a more precise and regular application of the adhesive material to the metal laminate, especially in the proximity of the cutting edges of each lamination. Moreover, the solution proposed with the present invention allows an extremely precise dosage of the adhesive material, thus avoiding waste of the adhesive material used.

Thanks to the plant and the method according to the present invention, it is possible to achieve ferromagnetic cores of electric machines in which the adhesive material and the activating compound, which are applied to the laminations, once put into contact with each other, do not protrude from the pack of laminations, which forms the ferromagnetic core achieved as a finished product.

BRIEF DESCRIPTION OF THE DRAWINGS

Further characteristics and advantages of the present invention will become clearer from the following description, made by way of non-limiting example with reference to the accompanying drawings, wherein:

FIGS. 16, 17A and 17B show another embodiment of a plant according to the present invention;

EMBODIMENTS OF THE INVENTION

Figure 1A:
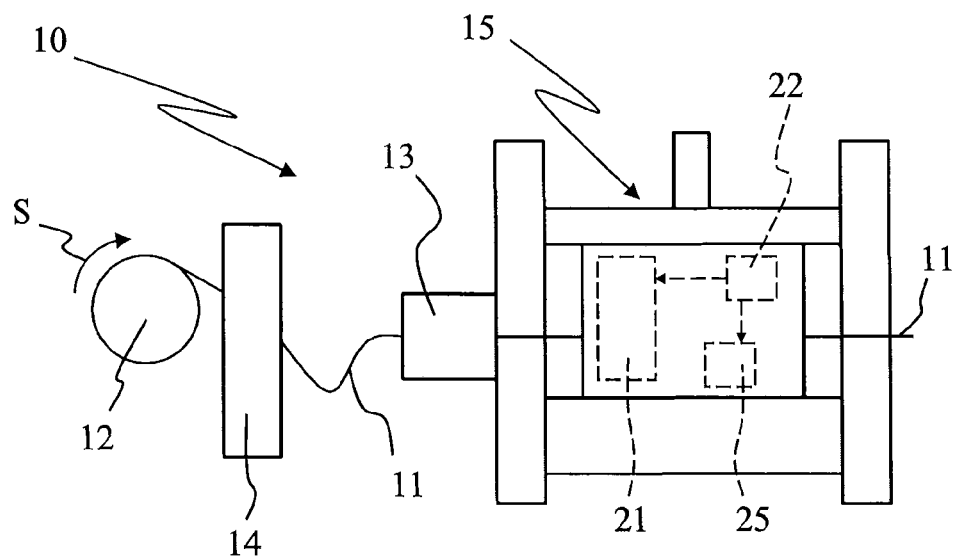
FIGS. 1A and 1B show embodiments of a plant according to the present invention.

FIG. 1A shows a general embodiment of a plant 10 for manufacturing ferromagnetic cores of electric machines. A continuous metal laminate 11 is fed from a reel 12 to a tool 15 for blanking/punching through a feeding unit 13. The continuous metal laminate 11 can be optionally passed through a calender 14 to carry out the yielding of the continuous metal laminate 11.

In the blanking/punching tool 15 according to the present invention, there are at least one unit 21 for applying an adhesive material to a surface of the continuous metal laminate 11, at least one unit 25 for applying an activating compound to the opposite surface of the continuous metal laminate 11. In the plant 10, there is also at least one control unit 22 for controlling the application of the adhesive material and the activating compound in the respective application units.

Figure 1B:
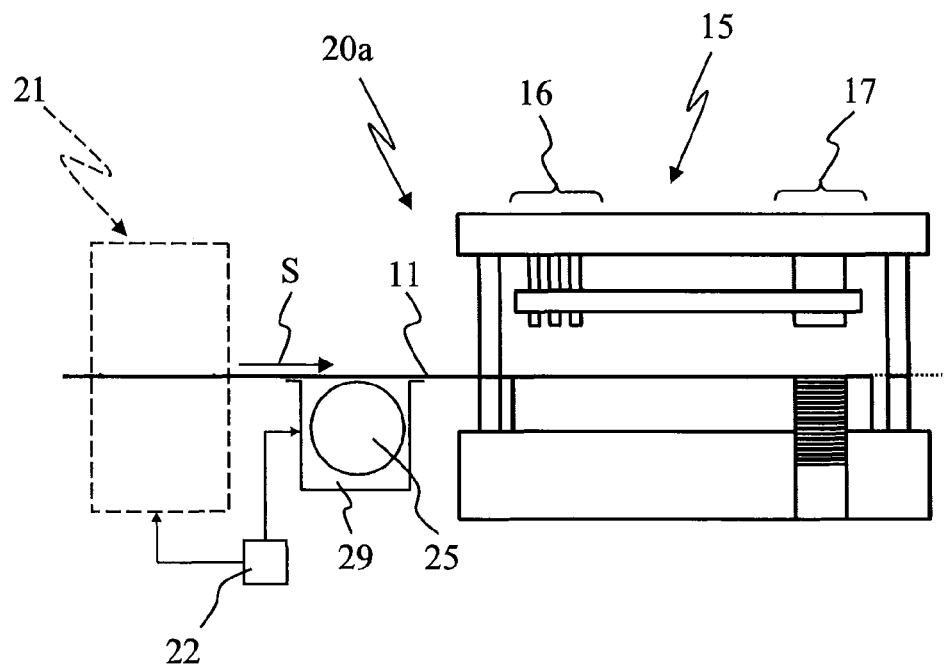

FIG. 1B shows an embodiment of a plant 20a in which the unit 21 for applying an adhesive material to a surface of the continuous metal laminate 11 and the unit 25 for applying an activating compound to the opposite surface of the continuous metal laminate 11 are placed outside the blanking/punching tool 15, e.g. downstream of the feeding unit 13 for feeding the continuous metal laminate (FIG. 1A) and upstream of the blanking/punching tool 15. The plant 20a comprises a unit 21 for applying an adhesive material, a control unit 22 and a unit 25 for applying an activating compound to the opposite surface of the continuous metal laminate 11.

The unit 25 is combined with a chamber 29 in which a depressurized condition is provided to prevent the dispersion of potentially harmful volatile compounds into the environment in which the personnel work. The unit 25 for applying an activating compound to the opposite surface of the continuous metal laminate 11 is sketched herein by a cylinder, but it should be pointed out that, here and hereinafter, the activating compound can also be applied by other means, e.g., nozzles which apply by spraying the activating compound to the opposite surface of the continuous metal laminate 11. In any case, in the plant 20a of FIG. 1B, the units 21 and 25 are released from the movements of the press in the blanking/punching tool 15.

In the embodiment of FIG. 1B, a station 16 for blanking the profiles of each lamination and a station 17 for cutting and packing the blanked laminations are also emphasised, both stations being included in the blanking/punching tool 15. In the station 16, the continuous metal laminate 11 is subjected to the blanking of the various profiles to define the geometries of the lamination and finally, as the last operation, the blanking of the outer contour of the geometry in the station 17 and the packing are carried out, with the consequent formation of the pack of laminations.

Figure 2:
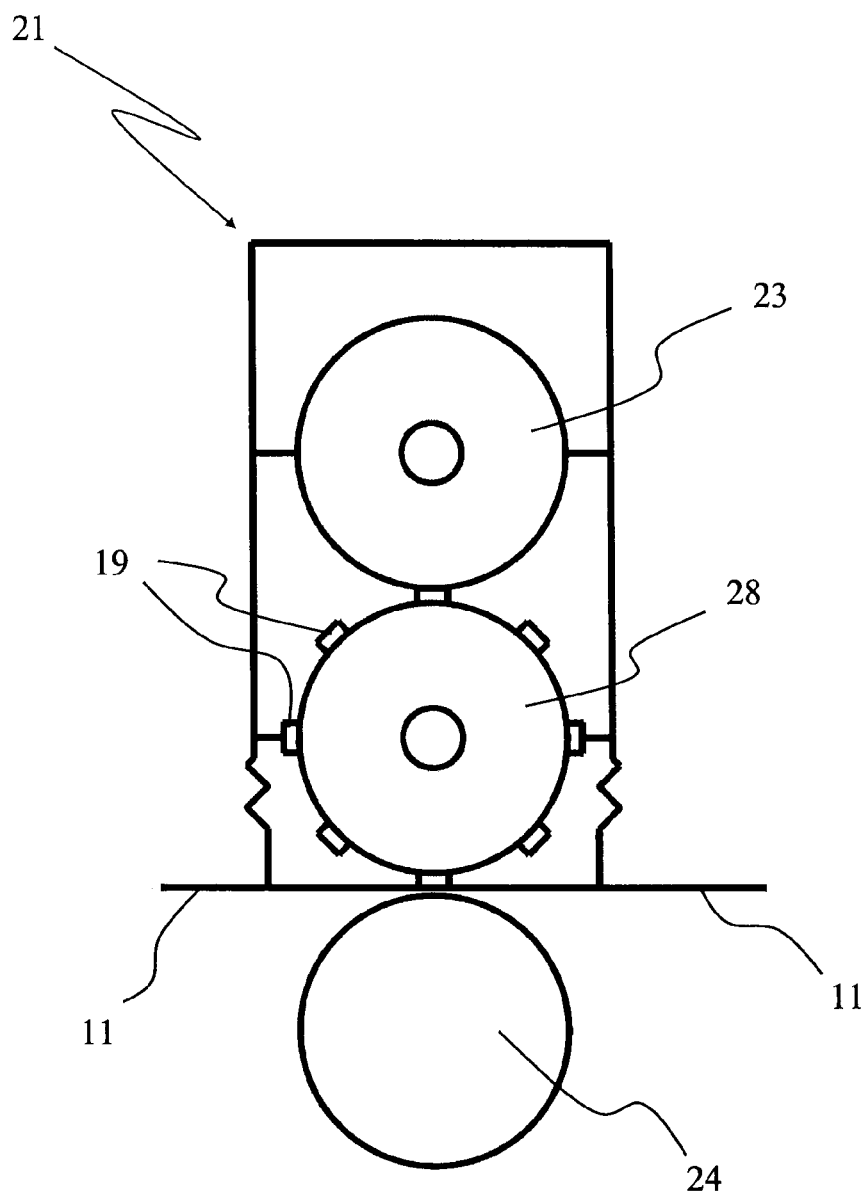
FIG. 2 shows the scheme of a unit for applying the adhesive material according to an embodiment of the present invention.
Figure 3:
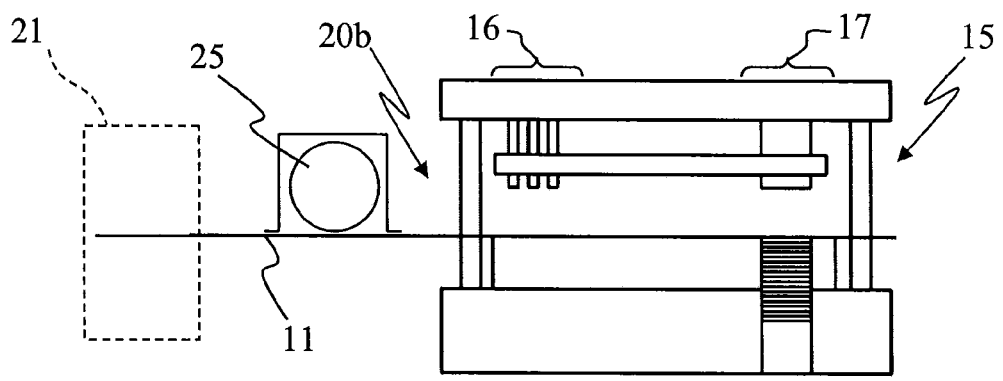
FIGS. 3-13 show various embodiments of a plant according to the present invention.

In the scheme of FIG. 2, an embodiment of a unit 21 for applying the adhesive material is shown. The unit 21 comprises a printing device 23 which deposits the adhesive material on a transfer element 28 which, in turn, applies the adhesive material to one face of the continuous metal laminate 11 according to one or more impressions of a shape corresponding to the outline of each of the laminations, and a contrast roller 24 in a position opposite the transfer element 28. The contrast (or counter-pressure) roller 24 has the purpose of supporting the continuous metal laminate 11 during the application of the adhesive material, by controlling its distance with respect to the transfer element 28.

This scheme shows a transfer element 28 consisting of a cylinder equipped with pads 19 made of or coated with e.g. an elastic material, such as rubber, natural rubber or the like, which receive the adhesive material from the printing device 23. The transfer element 28 can also consist of a cylinder with smooth surface, i.e. free of the pads 19, which is also made of an elastic material.

FIGS. 3 to 13 depict various embodiments with regard to the arrangement of the plant components. For example, in the plant 20*b* of FIG. 3, the unit 21 applies the adhesive material to the lower face of the continuous metal laminate 11, while the activating compound is applied by the unit 25 to the upper face of the continuous metal laminate 11.

Figure 4:
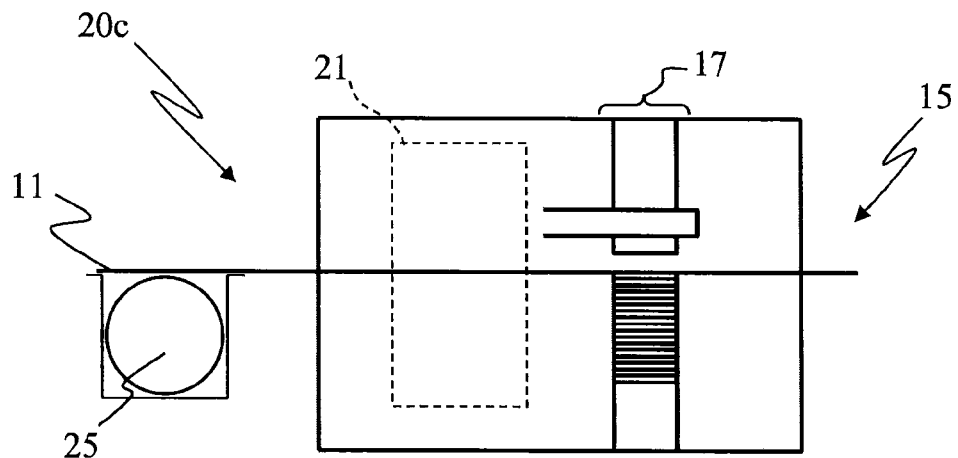

In the plant 20*c* of FIG. 4, the activating compound is applied by the unit 25 to the lower face of the continuous metal laminate 11 outside, and upstream, of the blanking/punching tool 15, while the adhesive material is applied by the unit 21 to the upper face of the continuous metal laminate 11 inside the blanking/punching tool 15.

Figure 5:
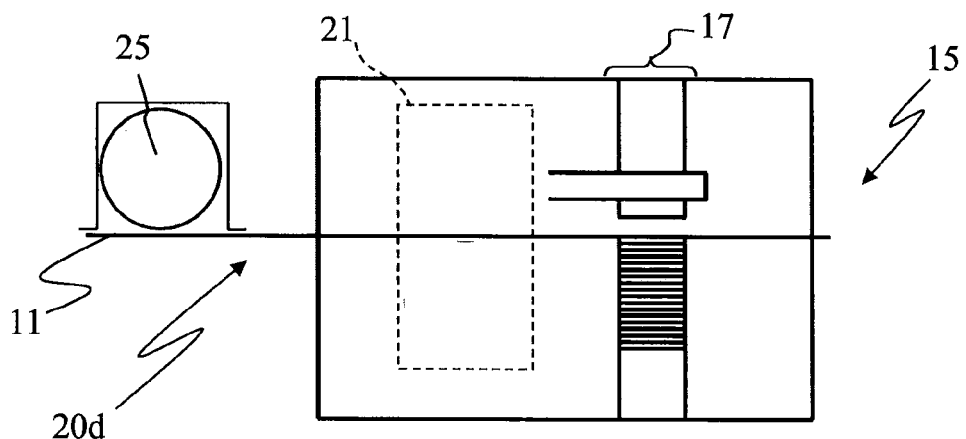

The plant 20*d* of FIG. 5 also has the unit 25 placed outside, and upstream, of the blanking/punching tool 15 and the activating compound is applied to the upper face of the continuous metal laminate 11, while the adhesive material is applied by the unit 21 to the lower face of the continuous metal laminate 11 inside the blanking/punching tool 15.

Figure 6:
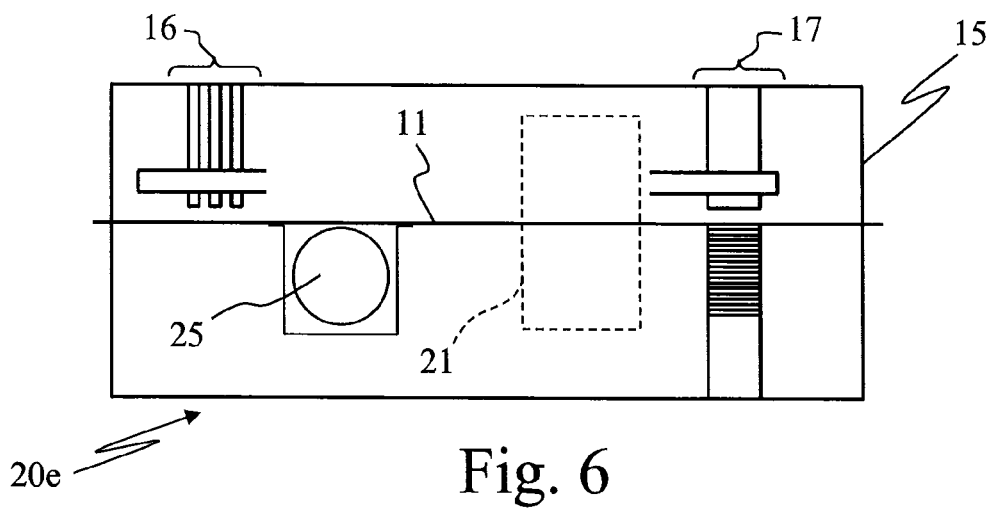

In the plant 20*e* of FIG. 6, both units 21 and 25 are included inside the blanking/punching tool 15. The activating compound is applied by the unit 25 placed upstream of the unit 21 for applying the adhesive material to the lower face of the continuous metal laminate 11.

Figure 7:
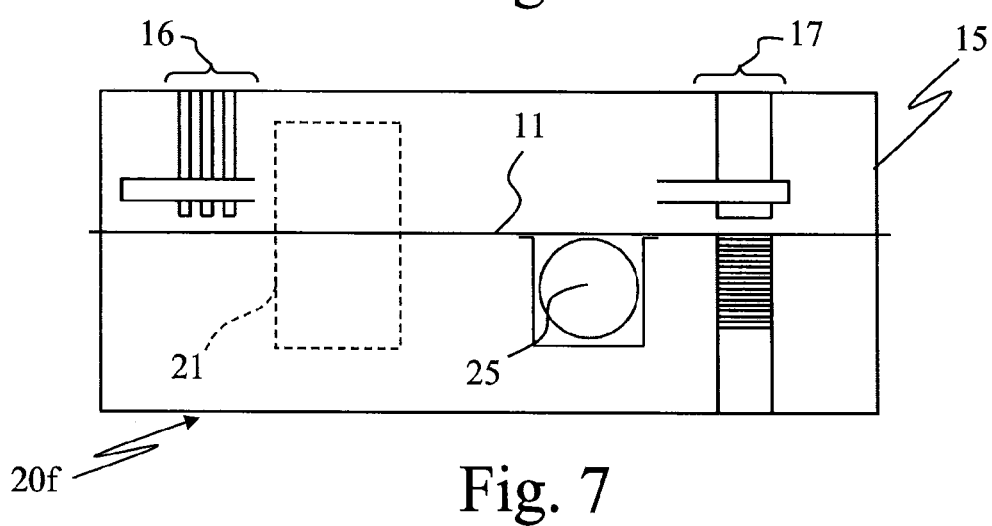

Also in the plant 20*f* of FIG. 7, both units 21 and 25 are included inside the blanking/punching tool 15. Upstream, the adhesive compound is applied to the upper face of the continuous metal laminate 11 by the unit 21, while downstream, the activating compound is applied by the unit 25.

Figure 8:
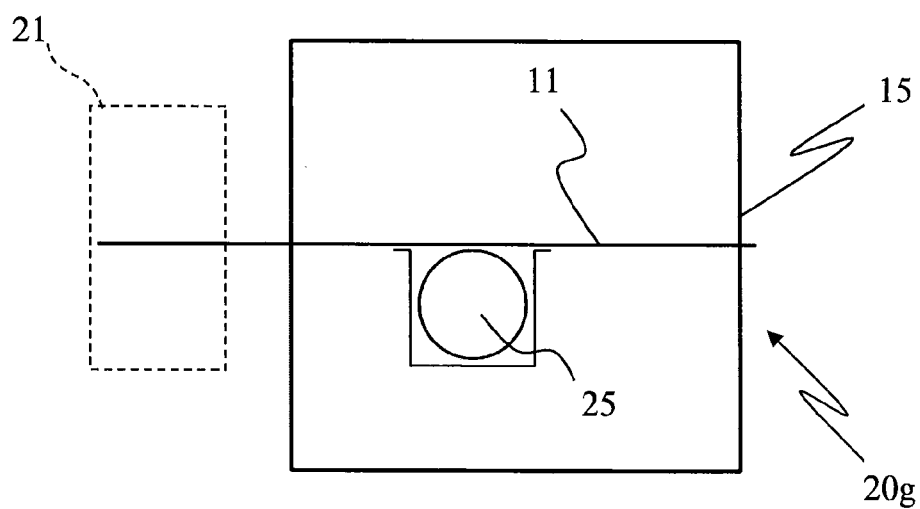

In the plant 20*g* of FIG. 8, the unit 21 for applying the adhesive material is placed outside the blanking/punching tool 15 and applies the adhesive material to the upper face of the continuous metal laminate 11, while the unit 25 for applying the activating compound is placed inside the blanking/punching tool 15 and applies the activating compound to the lower face of the continuous metal laminate 11.

Figure 9:
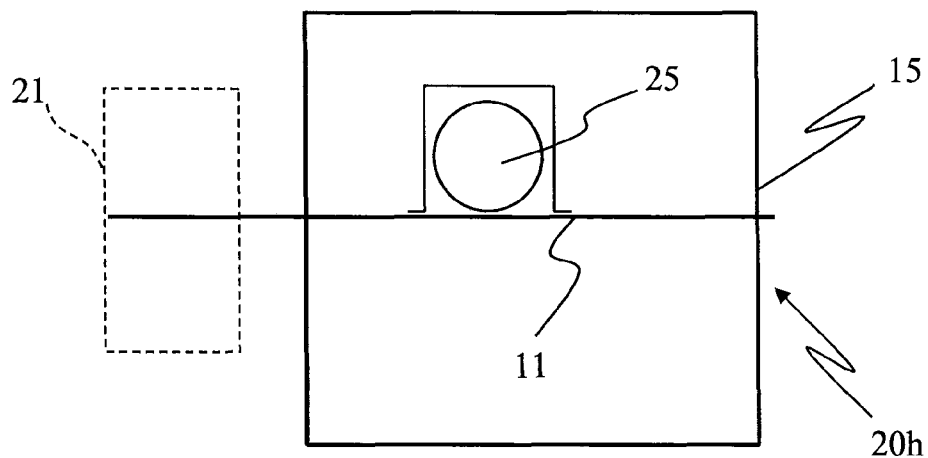

The plant 20*h* of FIG. 9 is similar to that of FIG. 8, with the difference that the activating compound is applied by the unit 25 to the upper face of the continuous metal laminate 11, while the adhesive material is applied to the lower face of the continuous metal laminate 11 by the unit 21.

Figure 10:
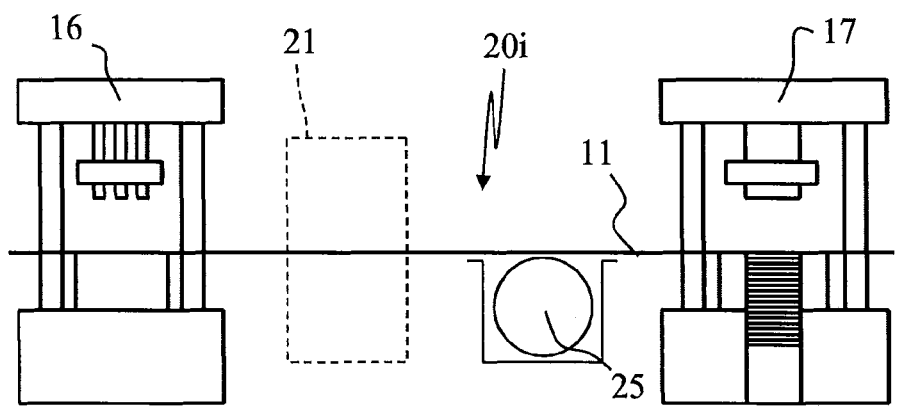
Figure 11:
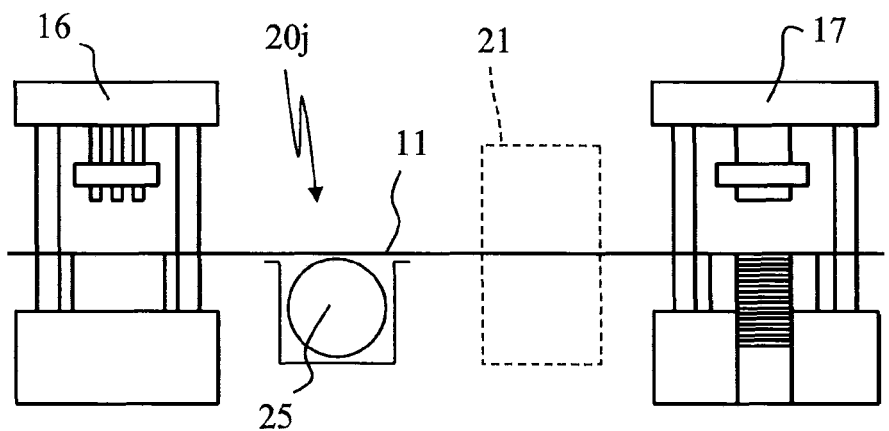

In the plant 20*i* of FIG. 10, the blanking/punching station 16 is separated from the subsequent station 17 for cutting and packing the laminations separated from the continuous metal laminate 11. The unit 21 for applying the adhesive material and the unit 25 for applying the activating compound are arranged between the stations 16 and 17. The same applies to the plant 20*j* of FIG. 11. In the plant 20*i* of FIG. 10, the unit 21 for applying the adhesive material is placed upstream of the unit 25 for applying the activating compound, while in the plant 20*j* of FIG. 11, the unit 25 is placed upstream with respect to the unit 21. In both plants 20*i* and 20*j*, the adhesive material is applied to the upper face of the continuous metal laminate 11, while the activating compound is applied to the lower face of the continuous metal laminate 11.

Figure 12:
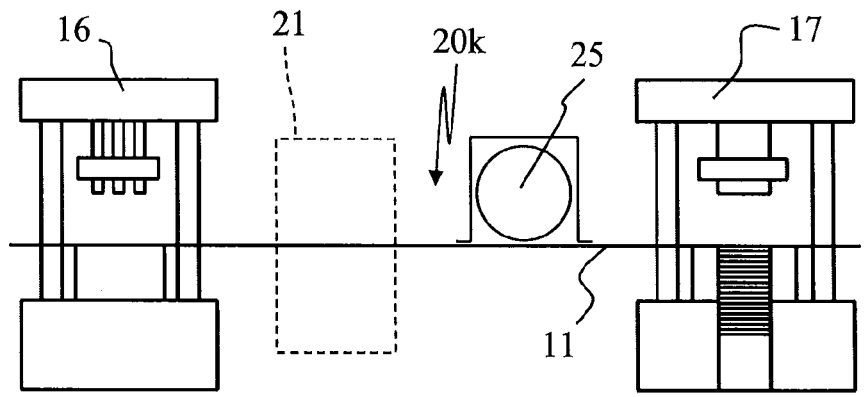
Figure 13:
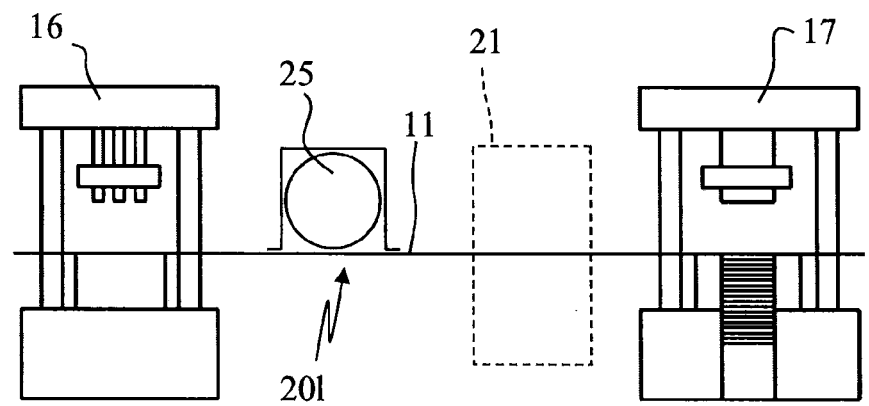

Also in the plant 20*k* of FIG. 12, the blanking/punching station 16 is separated from the subsequent station 17 for cutting and packing the laminations separated from the continuous metal laminate 11. The unit 21 for applying the adhesive material and the unit 25 for applying the activating compound are arranged between the stations 16 and 17. The same applies to the plant 20*l* of FIG. 13. In the plant 20*k* of FIG. 12, the unit 21 for applying the adhesive material is placed upstream of the unit 25 for applying the activating compound, while in the plant 20*l* of FIG. 13, the unit 25 is placed upstream with respect to the unit 21. In both plants 20*k* and 20*l*, the adhesive material is applied to the upper face of the continuous metal laminate 11, while the activating compound is applied to the lower face of the continuous metal laminate 11.

Figure 14:
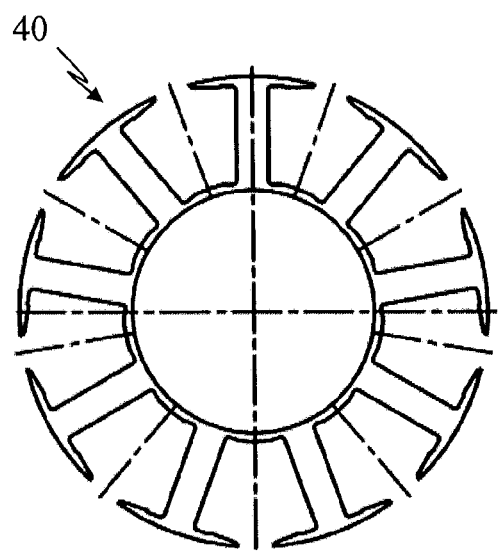
FIG. 14 depicts the contour of a metal lamination before applying the adhesive material.
Figure 15A:
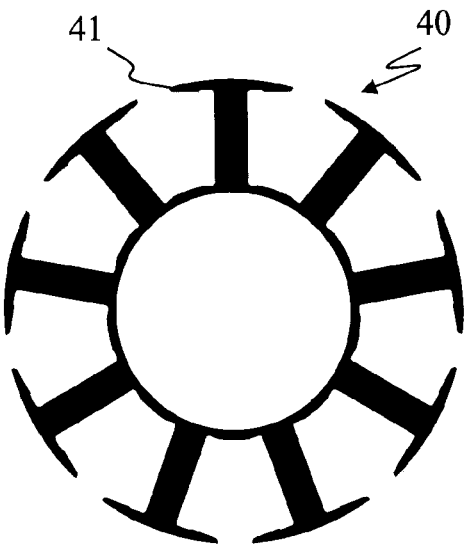
FIG. 15A depicts the contour of a metal lamination after applying the adhesive material.

FIG. 14 shows by way of example the outline of a lamination 40, which will constitute the rotor of an electric rotary machine, before applying the adhesive material, while FIG. 15A shows the same outline of a lamination 40 after applying the adhesive material.

Figure 15B:
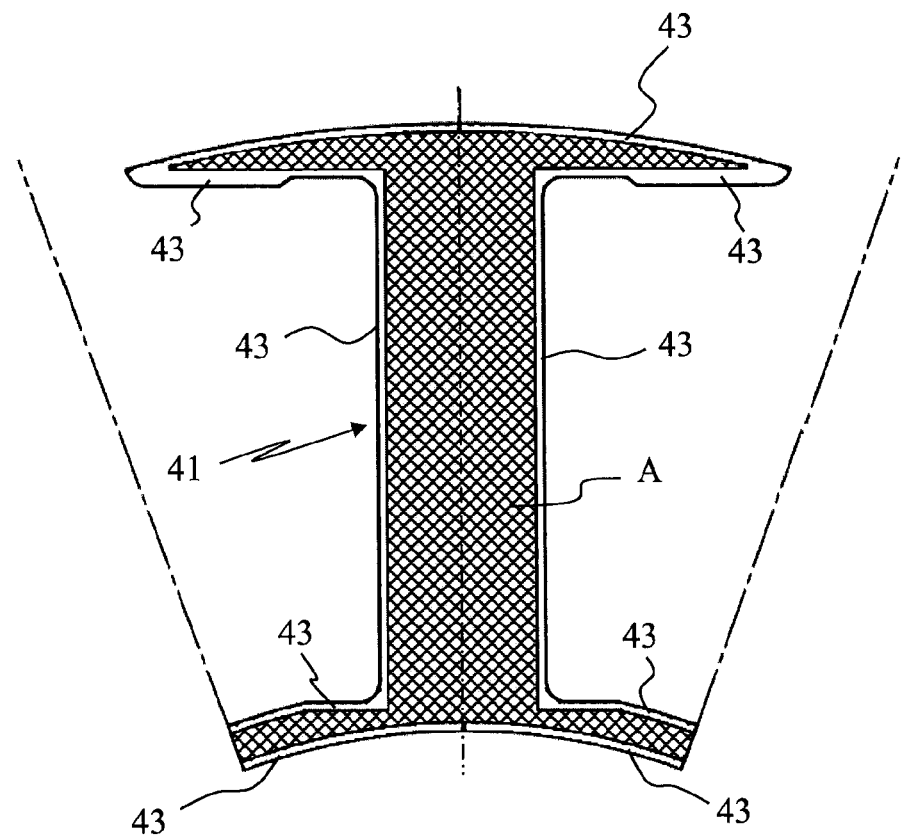
FIG. 15B is an enlarged view of a pole piece of the lamination shown in FIG. 15A.

FIG. 15B depicts an enlarged view of a pole piece 41 of the lamination of FIG. 15A. As can be seen, the adhesive material A can be applied to a large part of the surface of the lamination 40 according to the outline and geometry of the same lamination, with the exception of an area 43 free of adhesive material in the proximity of the edges.

Figure 22:
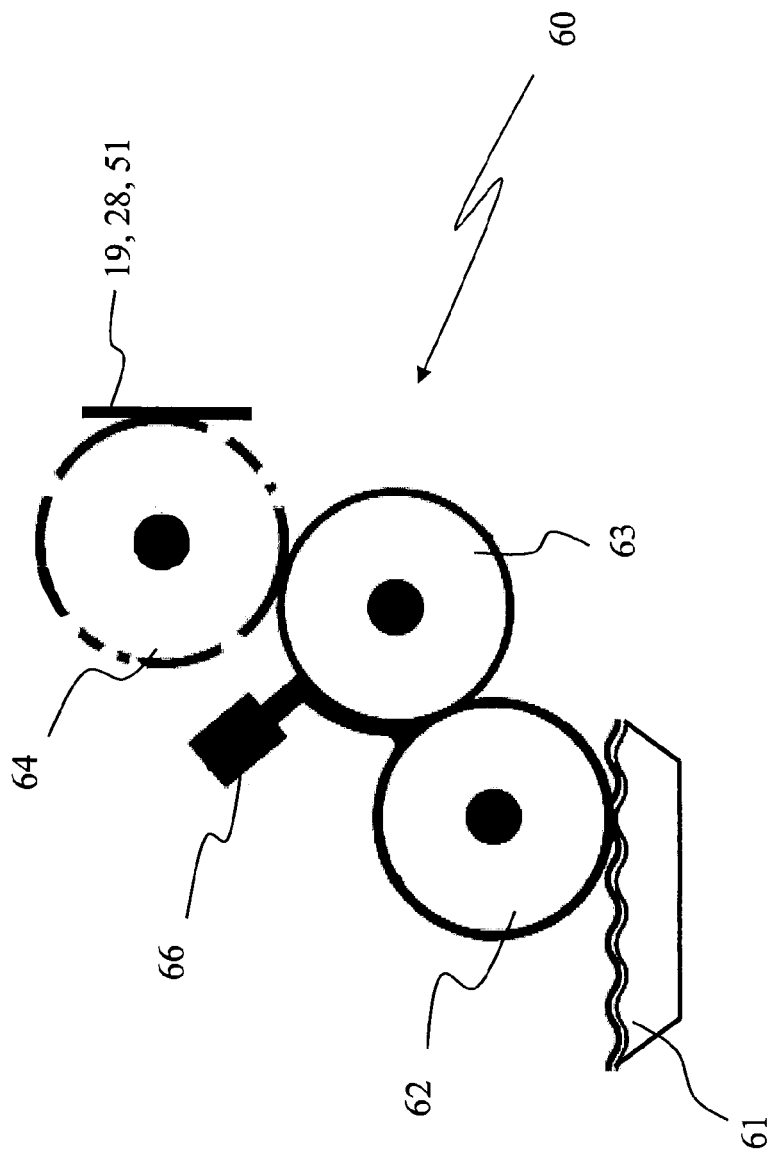
FIG. 22 shows a further example of deposit of the adhesive material by the flexography technique.
Figure 23:
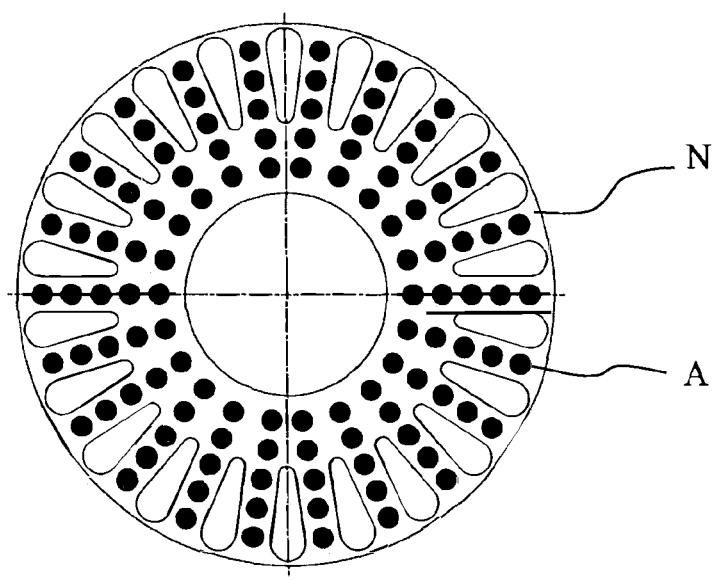
FIGS. 23-27 depict some examples of application of adhesive materials according to the prior art.
Figure 24:
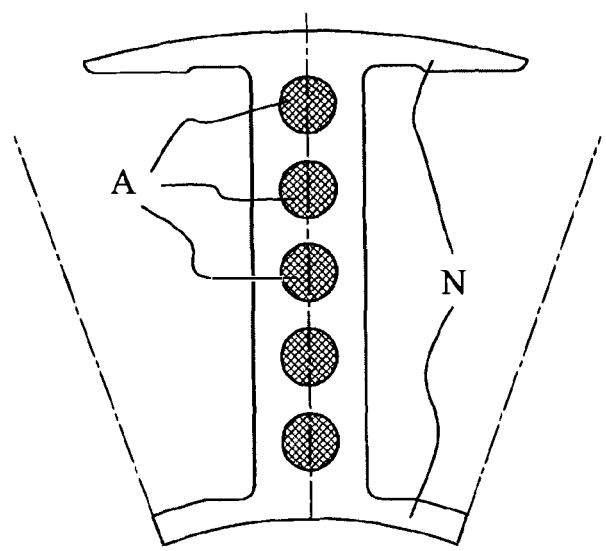
Figure 25:
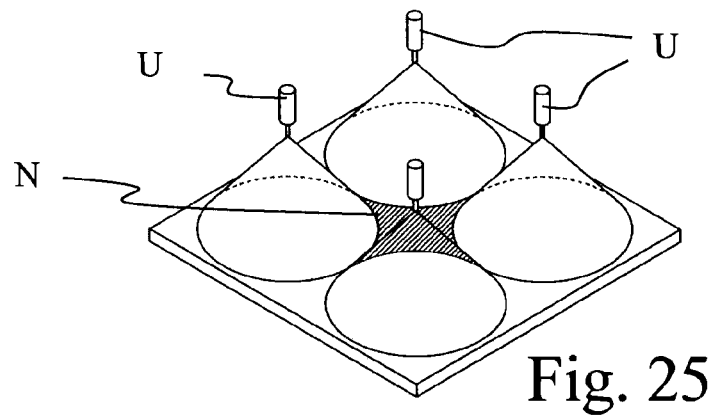
Figure 26:
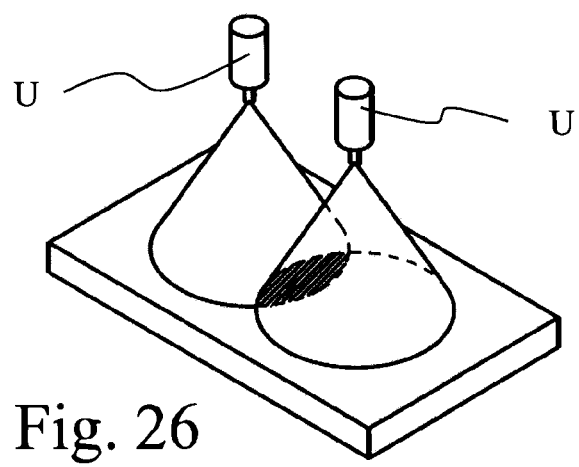
Figure 27:
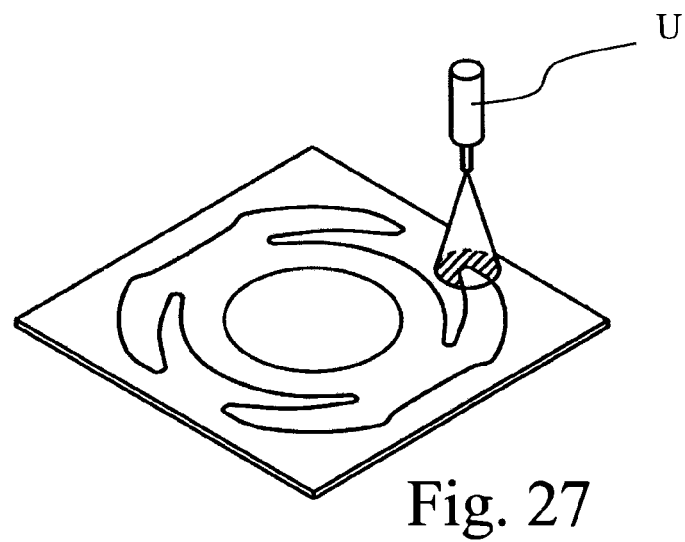

FIGS. 16, 17A and 17B show an embodiment of a plant 50 in which the adhesive material A is deposited on transfer elements, such as e.g. rubber or natural rubber pads 51, which are fastened to a closed belt 52. A printing device 23 or 60 deposits the adhesive material on the pads 51. The printing device 23 or 60 can be, e.g., a circular or rotary silk-screen printing device (FIG. 20A), or a flat silk-screen printing device (FIG. 20B) or a flexo-printing device 60 (FIG. 22).

This embodiment allows to achieve a decoupling of the unit for applying the adhesive material with respect to the speed or position of the continuous metal laminate 11.

The blanking/punching tool 15 is crossed by the belt 52 where the various rubber or natural rubber pads 51 are arranged. In the plant 50, the printing device 23 or 60 can continuously deposit the adhesive material on the pads 51. In the plant 50, between one pad 51 and the other, there is air and, therefore, the printing device 23 or 60 can always be in motion.

The belt 52, on which the pads 51 are mounted, will have a loop of suitable length, in such a way as to allow the screen 26 to work continuously, and will move in synchronism with the cycle of the press that operates the blanking/punching tool 15. When a pad 51, on which the adhesive material has been deposited, is in the proximity of the continuous metal laminate 11, a presser 55 presses the pad 51 on the continuous metal laminate 11, thus transferring the adhesive material from the pad 51 to the continuous metal laminate 11.

The activating compound can be applied to the opposite face of the continuous metal laminate 11 by a unit 25 such as that already described in the preceding embodiments.

Figures 18, 19A, 19B:
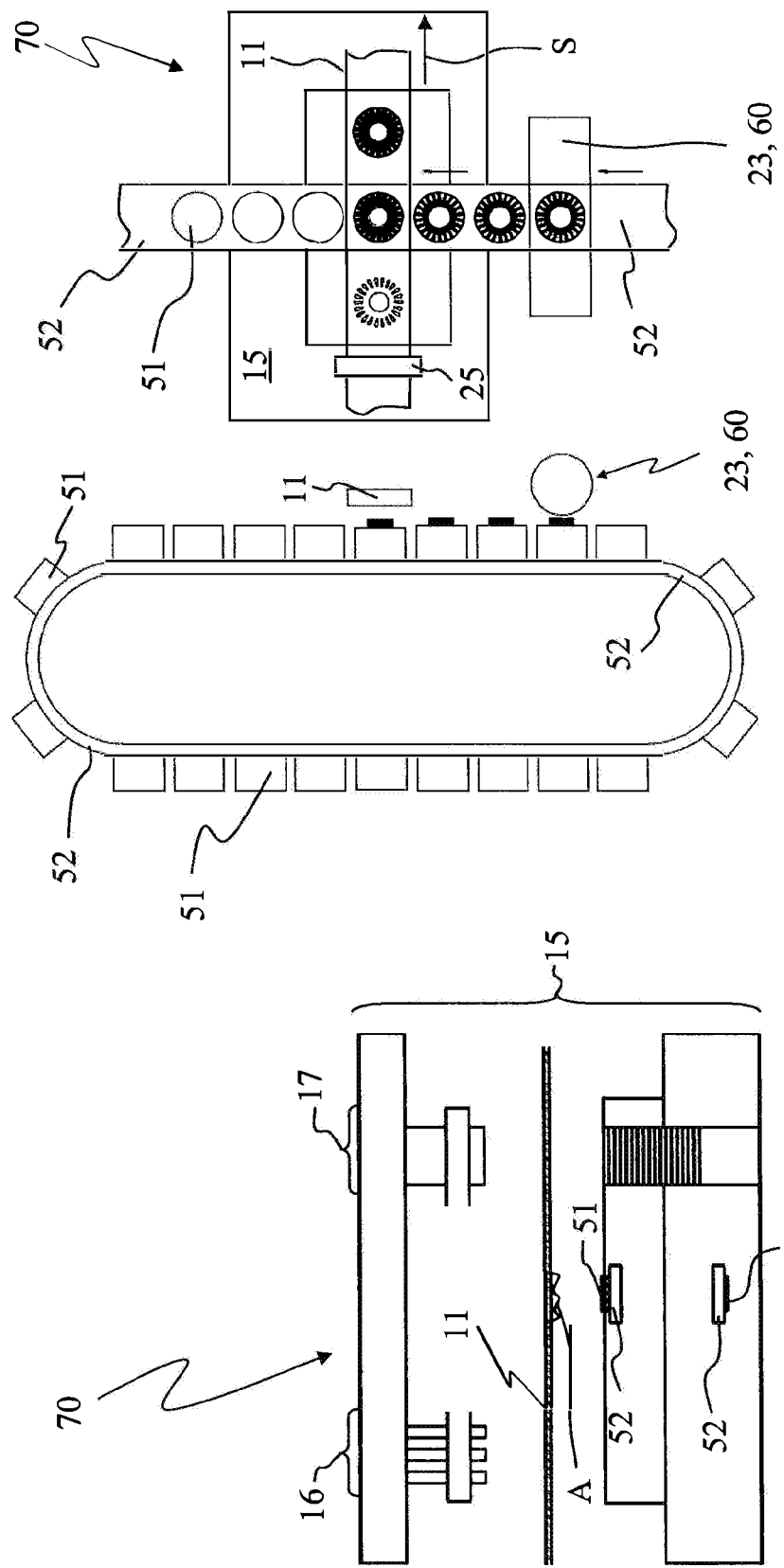
FIGS. 18, 19A and 19B show another embodiment of a plant according to the present invention.

The embodiment of the plant 70 shown in FIGS. 18, 19A and 19B is similar to that of FIGS. 16, 17A and 17B, with the difference that the adhesive material is applied to the lower face of the continuous metal laminate 11, while the activating compound is applied to the upper face of the lamination. The pads 51 are then mounted outside the belt 52. The printing device 23 or 60 is arranged along the path defined by the belt 52. A possible presser (not shown) is embedded in the lower part of the blanking/punching tool 15.

Figure 20A:
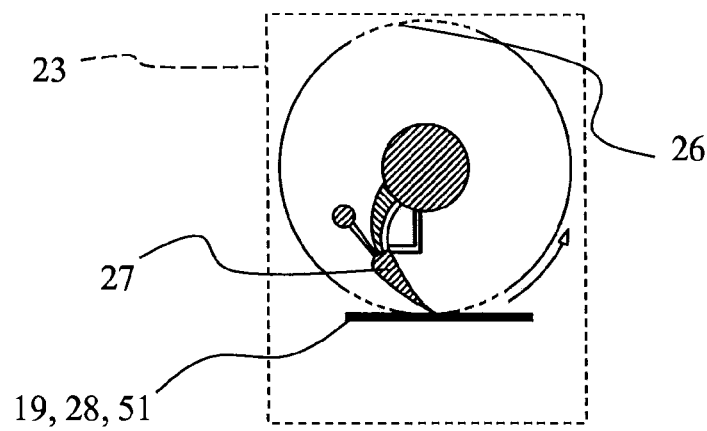
FIG. 20A depicts an example of deposit of the adhesive material by the circular (or rotary) silk-screen printing technique.
Figure 20B:
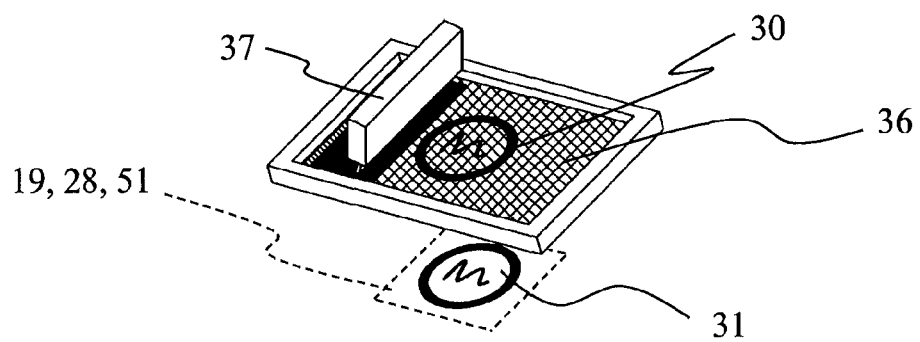
FIG. 20B depicts an example of deposit of the adhesive material by the flat silk-screen printing technique.

FIGS. 20A and 20B show some silk-screen printing techniques that can be adopted by a printing device 23. The printing device 23 of FIG. 20A is sketched here in the form of a circular or rotary silk-screen printing device, i.e. a printing device equipped with a circular or rotary cylindrical silk-screen 26. The cylindrical screen 26 can be made, e.g., of metallic, synthetic, natural material, etc. The amount of adhesive material distributed by a silk-screen depends on the type of screen adopted. The weft of the screen (number of threads and diameter of the same) allows to have wide flexibility in terms of amount and thickness of adhesive deposited. The deposition of the adhesive material on the transfer element 28, which can be a smooth-surface cylinder, a pad 19 or a pad 51, is caused by the pressure exerted by a flat doctor blade 27 and the centrifugal force. More precisely, from a theoretical point of view, the silk-screen should never touch the transfer element 28, 19 or 51.

The adhesive material is fed into the printing device 23 through a suitable pump and forced between the meshes of the screen 26 through the pressure exerted by the flat doctor blade 27, also in combination with the centrifugal force acting on the screen 26 during its rotation.

FIG. 20B depicts the flat silk-screen printing technique. This technique can be used e.g. in the step of stopping between one translation and the other of the continuous metal laminate 11. Also in this case, a flat doctor blade 37 is used which acts in translation on a silk-screen 36 to press the adhesive material through the open meshes of the silk-screen 36. For example, the meshes of the silk-screen 36 are open next to at least one impression 30 which has a shape corresponding to the outline of each of the laminations to deposit the adhesive material on each of the transfer elements 28, 19 or 51. The adhesive material is thus applied according to the outline 31 of each lamination.

Figure 21:
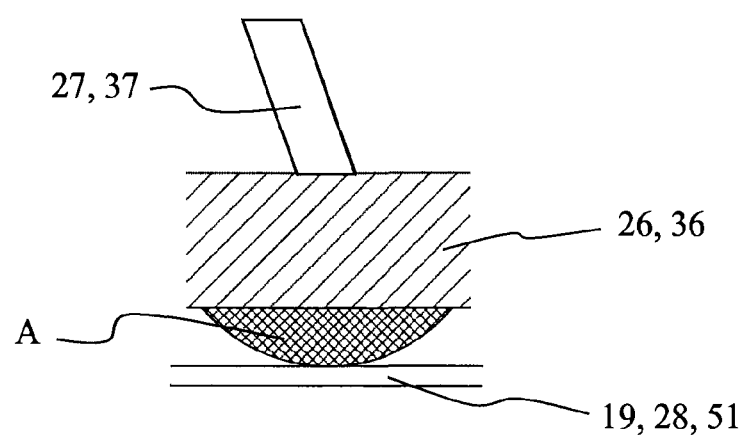
FIG. 21 is an enlarged view which depicts the action of a flat doctor blade running on a silk-screen.

The silk-screen printing technique is also depicted in the enlarged scheme of FIG. 21, in which the flat doctor blades 27, 37 are emphasised which press the adhesive material A through the open meshes of each silk-screen 26, 36 to deposit it on the surface of the continuous metal laminate 11.

According to the silk-screen printing technique, as depicted schematically in FIG. 21, it is the drop of adhesive material A which, retained by the screen, migrates from the silk-screen 26 or 36 to the transfer element 19, 28 or 51 under the effect of the pressure exerted by the flat doctor blade 27 and, in the case of circular or rotary silk-screen printing, also under the effect of the centrifugal force of the cylindrical silk-screen 26 during its rotation.

FIG. 22 shows an alternative embodiment to silk-screen printing for depositing the adhesive material on a transfer element 19, 28 or 51. In this embodiment, the printing device is a device 60 adopting a flexography technique.

Unlike the rotary silk-screen printing, which uses a single cylindrical screen fed therein with the adhesive material, the device 60 comprises a feeding tray 61 filled with adhesive material. A first roller 62 draws the adhesive material from the tray 61 and deposits it on an anilox-type roller 63, which in turn deposits the adhesive material on a rotary rubber plate 64. The plate 64 then deposits the adhesive material by contact on a transfer element 19, 28 or 51. A flat doctor blade 66 allows the excess adhesive material to be removed from the anilox-type roller 63.

Various changes can be made to the embodiments described herein without departing from the scope of the present invention, determined by the following claims. Geometric shapes and materials may differ from those shown so far schematically by way of example.

The invention claimed is:

1. A plant for manufacturing ferromagnetic cores of electric machines, wherein each of said ferromagnetic cores comprises a plurality of laminations packed in a blanking/punching tool to which a continuous metal laminate of ferromagnetic material is fed, the plant comprising:
at least one adhesive material applicator adapted to apply said adhesive material to a surface of said continuous metal laminate of ferromagnetic material before said continuous metal laminate is fed to said blanking/punching tool;
at least one activation unit in which an activator applies an activating compound to the opposite surface of said continuous metal laminate after said adhesive material applicator applies said adhesive material and before said continuous metal laminate is fed to said blanking/punching tool, said at least one activation unit disposed in a depressurized chamber; and
at least one controller adapted to control the application of said adhesive material and said activating compound into the adhesive material applicator and the activation unit,
wherein said at least one adhesive material applicator comprises a printer and at least one transfer device on which said printer deposits the said adhesive material according to one or more impressions of a shape corresponding to an outline of each of said laminations of said plurality of laminations, said adhesive material being then applied by said at least one transfer device to said surface of said continuous metal laminate according to the outline of each lamination, defined by said impressions.

2. The plant according to claim 1, wherein said at least one transfer device comprises one or more pads each receiving one or more impressions of said adhesive material from said printer, said printer comprising a silk-screen printer or from a flexo-printer.

3. The plant according to claim 2, wherein said one or more pads are constrained to a cylindrical roller interposed between said printer and said continuous metal laminate.

4. The plant according to claim 2, wherein said one or more pads are constrained to a closed belt which moves in a transverse direction with respect to a direction of travel of the continuous metal laminate, and wherein said printer which deposits the adhesive material on said pads is arranged along the path defined by said closed belt.

5. The plant according to claim 1, wherein said printer comprises a circular or rotary silk-screen device with a cylindrical silk screen and a flat doctor blade adapted to apply pressure to cause the deposition of the adhesive material on the transfer device.

6. The plant according to claim 1, wherein said printer is a printing device which adopts a flat silk-screen printing technique or a flexography technique.

7. The plant according to claim 1, wherein said blanking/punching tool is adapted to have said continuous metal laminate fed thereto after said activating compound is applied thereto, said blanking/punching tool comprising a blanking/punching station adapted to blank said continuous metal laminate into said plurality of laminations and at least one cutting station adapted to cut and pack the plurality of laminations blanked from said continuous metal laminate.

8. The plant according to claim 1, wherein said printer comprises at least one presser that presses a corresponding pad of said at least one transfer device and upon which said adhesive has been deposited, onto said continuous metal laminate.

9. The plant according to claim 1, wherein said printer comprises a feeding tray filled with said adhesive material, a first roller that draws the adhesive material from the feeding tray and deposits it on an anilox roller which deposits the adhesive material on a rotary rubber plate which deposits the adhesive material on said transfer device, and a flat doctor blade adapted to remove excess adhesive material from the anilox roller.

10. A method for manufacturing ferromagnetic cores of electric machines, wherein each of said ferromagnetic cores is formed by a plurality of laminations packed in a blanking/punching tool to which a continuous metal laminate of ferromagnetic material is fed, said laminations being joined together by gluing, said blanking/punching tool comprising at least one blanking/punching station and at least one cutting station adapted to cut and pack the laminations blanked from said continuous metal laminate, the method comprising the steps of:
  a) advancing said continuous metal laminate of ferromagnetic material through a plant for manufacturing ferromagnetic cores of electric machines;
  b) applying an adhesive material to a surface of said continuous metal laminate through at least one adhesive material application unit, said applying controlled by at least one controller of the plant for manufacturing ferromagnetic cores of electric machines; and
  c) after said step b), applying an activating compound, in a depressurized condition, to the opposite surface of said continuous metal laminate using at least one activation unit controlled by said controller;
  wherein, in said step b), said adhesive material is deposited by a printer on at least one transfer device according to one or more impressions of a shape corresponding to an outline of each of said laminations, said adhesive material being then applied by said at least one transfer device to said surface of said continuous metal laminate according to the outline of each lamination, defined by said impressions, and
  said at least one transfer device comprises one or more pads, each receiving said adhesive material deposited thereon, and
  further comprising a presser pressing said pads upon which said adhesive has been deposited, on said continuous metal laminate.

11. The method according to claim 10, wherein said step c) takes place before said continuous metal laminate reaches said blanking/punching tool.

12. The method according to claim 10, wherein said one or more impressions of adhesive material, which are deposited on said at least one transfer element to be then applied to said surface of said continuous metal laminate, have the same outline as each of said laminations and reduced dimensions in a proximity of edges that follow the geometry of each of said laminations to leave an area free of adhesive material in the proximity of said edges.

13. The method according to claim 10, wherein
  each of said one or more pads receives one or more impressions of said adhesive material deposited thereon, said printer comprises a circular or rotary silk-screen printer, and
  further comprising a flat doctor blade applying pressure to cause the adhesive material to be deposited on the transfer device.

14. The method according to claim 10, wherein said adhesive material is deposited by a flat silk-screen printing technique or a flexography technique on said one or more pads and then applied to said surface of the continuous metal laminate.

15. The method according to claim 10, wherein said pads of said transfer device are disposed on a closed belt that moves in a direction transverse to a direction of travel of the continuous metal laminate.

16. A method for manufacturing ferromagnetic cores of electric machines, wherein each of said ferromagnetic cores is formed by a plurality of laminations packed in a blanking/punching tool to which a continuous metal laminate of ferromagnetic material is fed, said laminations being joined together by gluing, said blanking/punching tool comprising at least one blanking/punching station, the method comprising the steps of:
  a) advancing said continuous metal laminate of ferromagnetic material through a plant for manufacturing ferromagnetic cores of electric machines;
  b) applying an adhesive material to a surface of said continuous metal laminate through at least one adhesive material applicator controlled by at least one controller; and
  c) after said step b), applying an activating compound to the opposite surface of said continuous metal laminate through at least one applicator further controlled by said controller and before said continuous metal laminate is fed to said blanking/punching tool,
  wherein, in said step b), said adhesive material is deposited by a printer on at least one transfer device according to one or more impressions of a shape corresponding to an outline of each of said laminations, said adhesive material being then applied by said at least one transfer device to said surface of said continuous metal laminate according to the outline of each lamination, defined by said impressions,
  wherein said controller controls the application of said adhesive material and said activating compound into the adhesive material applicator and the applicator; and
  wherein said applying said activating compound to the opposite surface of said continuous metal laminate comprises providing said activating compound in a depressurized condition in a depressurized chamber.

17. The method according to claim 16, wherein, said step b) comprises printing using a feeding tray filled with said adhesive material, a first roller that draws the adhesive material from the feeding tray and deposits it on an anilox roller which deposits the adhesive material on a rotary rubber plate which deposits the adhesive material on said transfer device, and wherein a flat doctor blade removes excess adhesive material from the anilox-type roller.

18. A plant for manufacturing ferromagnetic cores of electric machines, wherein each of said ferromagnetic cores is formed by a plurality of laminations packed in a blanking/punching tool, the plant comprising:
an adhesive applicator adapted to apply an adhesive material to a surface of a continuous metal laminate of ferromagnetic material;
an activation unit in which an activator is adapted to apply an activating compound to the opposite surface of said continuous metal laminate after said adhesive applicator applies said adhesive material and before said continuous metal laminate is fed to said blanking/punching tool, said at least one activation unit disposed in a depressurized chamber; and
at least one controller adapted to control the application of said adhesive material and said activating compound into the adhesive applicator and the activation unit,
wherein said blanking/punching tool is adapted to have said continuous metal laminate fed thereto after said adhesive material has been applied to said surface of said continuous metal laminate, and
wherein said adhesive applicator comprises a printer and at least one transfer device on which said printer deposits the adhesive material according to one or more impressions of a shape corresponding to an outline of each of said laminations, said transfer device comprising one or more pads disposed on a closed belt that moves in a direction transverse to a direction of travel of the continuous metal laminate,
said adhesive material being then applied by said at least one transfer device to said surface of said continuous metal laminate according to an outline of each lamination, defined by said impressions.

19. The plant according to claim 18, wherein said printing device comprises at least one presser that presses a corresponding pad on which said adhesive material has been deposited, onto said continuous metal laminate.

20. The plant according to claim 18, wherein said printer comprises a feeding tray filled with said adhesive material, a first roller that draws the adhesive material from the feeding tray and deposits it on an anilox roller which deposits the adhesive material on a rotary rubber plate which deposits the adhesive material on said transfer device, and
a flat doctor blade adapted to remove excess adhesive material from the anilox-type roller.

* * * * *